United States Patent [19]

Shindelar

[11] Patent Number: 4,930,226
[45] Date of Patent: Jun. 5, 1990

[54] SENSOR ADJUSTMENT GAUGE
[75] Inventor: Aloysius C. Shindelar, Hudson, Iowa
[73] Assignee: Deere & Company, Moline, Ill.
[21] Appl. No.: 355,240
[22] Filed: May 22, 1989
[51] Int. Cl.⁵ .................................................. G01B 5/18
[52] U.S. Cl. .......................................... 33/655; 33/832
[58] Field of Search ................. 33/655, 832, 833, 836, 33/719

[56] References Cited
U.S. PATENT DOCUMENTS

| | | | |
|---|---|---|---|
| 1,266,977 | 5/1918 | Nelis | 33/836 |
| 2,533,522 | 12/1950 | Sisson | 33/832 |
| 2,642,670 | 6/1953 | Dow | 33/832 |
| 3,936,945 | 2/1976 | Jevremov | 33/836 |
| 4,531,295 | 7/1985 | Saathoff | 33/832 |
| 4,676,003 | 6/1987 | Dubois, Sr. | 33/655 |
| 4,760,847 | 8/1988 | Vaillancourt | 33/833 |

OTHER PUBLICATIONS

IBM Technical Disclosure Bulletin, vol. 13, No. 5 Oct. 1970, p. 1335 by Straitwell.

Primary Examiner—William A. Cuchlinski, Jr.
Assistant Examiner—Christopher W. Fulton

[57] ABSTRACT

A gauge includes a hollow ferrule which slidably receives a pin member therein. The gauge is inserted into a housing bore so that the pin engages an actuating member. The pin moves relative to the ferrule and separates a pair of abutment surfaces thereon by a distance which represents a number of shims or spacers required for proper positioning of a switch or sensor to be mounted in the housing bore.

6 Claims, 2 Drawing Sheets

SENSOR ADJUSTMENT GAUGE

BACKGROUND OF THE INVENTION

The present invention relates to a gauge for determining a proper position for a sensor mounted in a bore in a housing.

Certain vehicles, such as agricultural tractors, have a neutral start switch which is mounted in threaded bores in the transmission housing. The switch has a movable plunger which operatively engages an actuating member or shifter shaft movable in the housing so that the switch will toggle when the shifter cam is in a position corresponding to the transmission being in neutral. It is necessary to install the switch to the proper depth in the bore relative to the shifter cam so that proper switch operation is achieved. Heretofore, such switches have been installed and adjusted using a trial and error procedure whereby the switch is repeatedly installed with one additional shim each time until the switch fails to toggle when installed. Then, the switch is removed again and two washers are removed. Finally, the switch is reinstalled so that the switch is in one state when engaged by the shifter cam, but will toggle to its other state when the shifter cam moves away from the switch plunger. It would be desirable to provide a gauge which simplifies and speeds up this switch installation procedure.

SUMMARY OF THE INVENTION

An object of the present invention is to provide a gauge for simplifying and speeding up the operation of properly mounting a switch or sensing device.

This and other objects are achieved by the present invention wherein a gauge is placed in a housing bore in which a sensor or switch must be installed at a certain depth. The gauge includes a pin with a flange projecting radially from one end and to one side of the pin. The flange defines a first abutment surface. The gauge also includes a ferrule with a cylindrical shaft for insertion into the sensor bore. The shaft includes a pin bore for slidably receiving the pin and a portion of one end of the shaft defines a second abutment surface. The ferrule also includes a hollow, generally annular head or stop member and a U-shaped connecting member with a channel which interconnects the pin bore and the opening in the head. The gauge is assembled by inserting the pin member into the ferrule and sliding the pin into the pin bore until the end of the pin projects out from the shaft and the abutment surfaces engage each other. Then, the assembled gauge is inserted into the sensor bore until the head engages the housing. The engagement between the pin and an actuating member will separate the abutment surfaces by a gap which determines the number of shims which are to be mounted on the sensor or switch in order to install it at the proper depth in the sensor bore.

DETAILED DESCRIPTION

Figure 1:
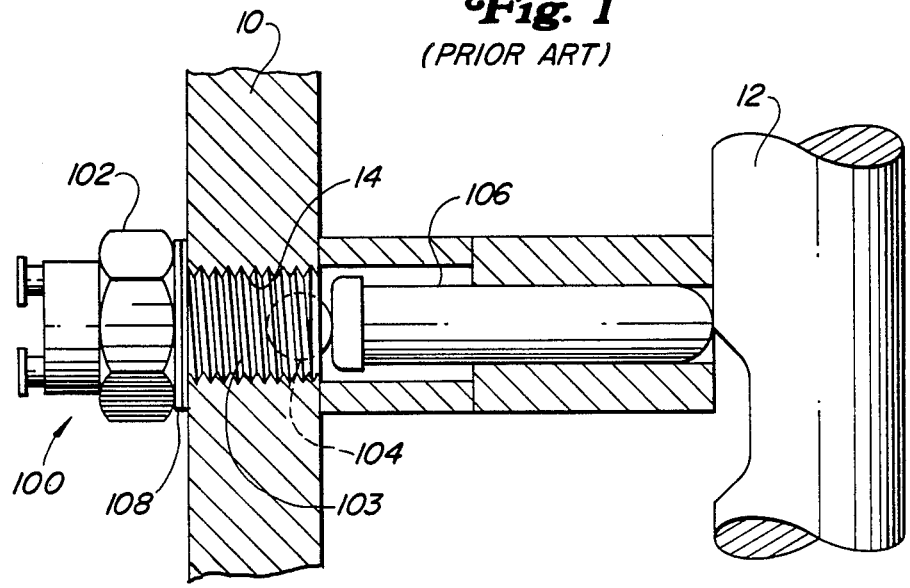
FIG. 1 is a cross-sectional view of the prior art mounting of a neutral start switch.
Figure 2:
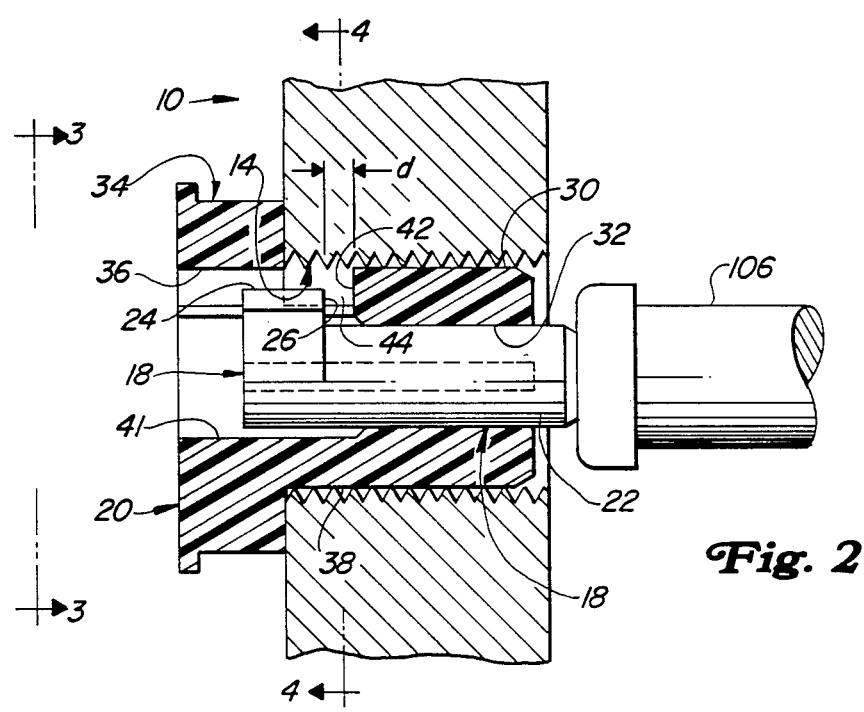
FIG. 2 is a cross-sectional view of the gauge of the present invention mounted in a bore in a transmission housing.
Figure 3:
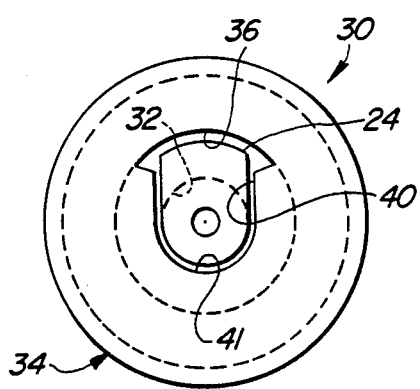
FIG. 3 is an end view in the direction of arrows 3—3 of FIG. 2.
Figure 4:
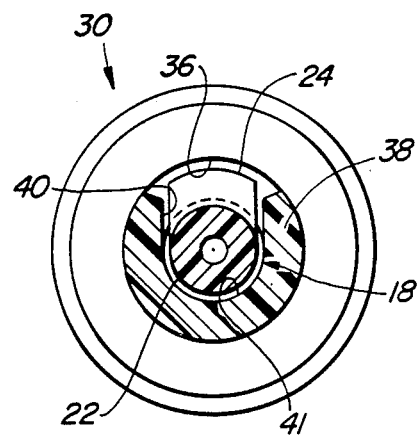
FIG. 4 is a view in the direction of arrows 4—4 of FIG. 2.
Figure 5:
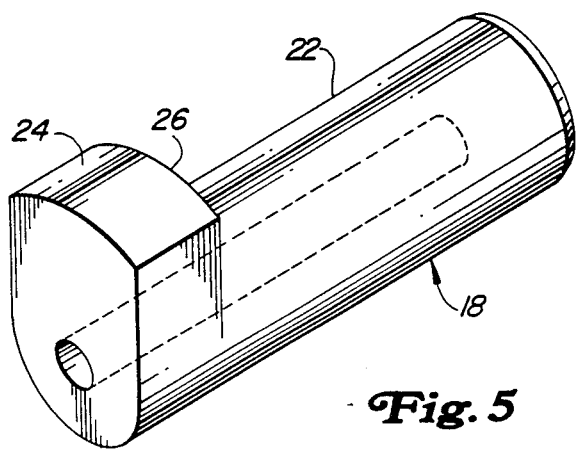
FIG. 5 is a perspective view of the pin member of the gauge of FIG. 2.

Referring to FIG. 1, there is shown the prior art arrangement of a portion of a transmission housing 10 near a shifter shaft 12. A threaded bore 14 extends through the housing 10. A commercially available, normally open switch 100 is threadably mounted in bore 14 and includes a head 102, a shaft 103 and an outwardly biased plunger member 104 which engages an actuator pin 106 which, in turn, engages the shifter shaft 12. When the shifter shaft 12 is moved to the neutral position shown in FIG. 1, the pin 106 and plunger are moved to the left, thus closing the switch 100. For proper operation, the switch 100 must be mounted at a certain distance from the shifter shaft 12. This is accomplished by installing shims or washers 108 on the shaft 103 between the head 102 and the housing 10 surrounding bore 14.

A gauge 16 for determining this spacing distance or the number of washers or shims corresponding thereto is shown in FIGS. 2–5. The gauge 16 includes a pin member 18 and a ferrule 20. The pin member includes a cylindrical pin 22 and a flange 24 which extends radially from one end of pin 22. The flange 24 defines an axially facing shoulder or abutment surface 26 and preferably has a width which is substantially the same as an outer diameter of pin 22.

The ferrule 20 includes a cylindrical shaft 30. A cylindrical pin bore 32 extends axially through shaft 30 and slidably receives pin 22. Ferrule 20 also includes a cylindrical head or stop member 34 through which extends an opening 36 which is large enough and shaped so that pin member 18 may be easily inserted therethrough. The head 34 includes a radially extending lip 37 which allows the gauge 16 to be easily removed from the bore 14. The ferrule 20 also includes a generally U-shaped connecting member 38 which joins a shaft 30 to the head 34. The connecting member 38 defines an open-sided channel 40 which extends axially therethrough and interconnects pin bore 32 to opening 36. The connecting member 38 has a cylindrical outer peripheral surface which joins smoothly with the outer surface of shaft 30. The connecting member 34 includes an inner part-cylindrical wall 41 which defines a bottom portion of channel 40. This wall 41 is coaxial with an axis of the pin bore 32 but the diameter of wall 41 and the width of channel 40 is larger than the diameter of pin bore 32 to facilitate insertion of pin member 18 into ferrule 20. Connecting member 38 and shaft 30 cooperate to define a shoulder surface 42 which faces axially towards the head 34.

The gauge 16 is assembled by inserting the pin member 18 through opening 36 and channel 40 and inserting pin 22 into pin bore 32 until shoulder 26 engages shoulder 42. The gauge 16 is then inserted into the housing bore 14 until head 34 engages the housing 10. During this process, the end of pin 22 will have engaged the actuating pin 106 and this engagement will cause relative movement between the pin member 18 ferrule 20 and will cause shoulder 26 to separate from shoulder 42 by a gap 44 having a width d. The gauge 16 is dimensioned so that this width d is the same as the spacing distance used for proper positioning of the sensor or switch device in the bore 14. The gauge 16 is then removed from the bore 14 so that the gap 44 can be measured or so that its user can determine how many shims can be easily inserted into the gap 44. This number of washers or shims can then be placed over the threaded housing of the sensor in order to properly position the sensor in the bore 14.

While the invention has been described in conjuction with a specific embodiment, it is to be understood that many alternatives, modifications and variations will be apparent to those skilled in the art in light of the aforegoing dscription. For example, a gauge similar to the gauge described herein could be utilized to properly install devices other than switches, such as a non-contacting proximity sensor, or any device which must be installed to a certain depth in a housing bore in order to properly engage or cooperate with an actuating member on one side of the housing. Accordingly, this invention is intended to embrace all such alternatives, modifications and variations which fall within the spirit and scope of the appended claims.

I claim:

1. A gauge for determining a spacing distance required to position a sensor in a sensor bore in a housing so that the sensor is properly positioned relative to an actuator member positioned adjacent to one side of the housing, the gauge comprising:
   a pin member comprising a pin and a flange extending from one end thereof, the flange defining a first abutment surface thereon; and
   a ferrule comprising a shaft for removable insertion into the sensor bore, the shaft having a pin bore extending therethrough for slidably receiving the pin, a portion of one end of the shaft defining a second abutment surface, the ferrule also comprising a head having an opening extending therethrough, and the ferrule comprising a connecting member joining the shaft and the head, the connecting member defining a channel which extends from the pin bore to the head opening, the pin and flange being movable through the opening and the channel so that the pin is slidably received by the pin bore, the pin being slidable through the pin bore to a gauging position wherein the pin projects outwardly from the shaft and engages the actuating member so that the engagement of the actuating member with the pin moves the pin relative to the ferrule whereby the first and second abutment surfaces separate by a distance equal to the spacing distance.

2. The gauge of claim 1, wherein:
the flange has a width which is substantially the same as an outer width of the pin.

3. The gauge of claim 1, wherein:
the connecting member has a generally U-shaped cross-sectional shape.

4. The gauge of claim 1, wherein:
the shaft and connecting member have smoothly joined outer peripheral surfaces.

5. The gauge of claim 1, wherein:
the shaft and connecting member have smoothly joined cylindrical outer peripheral surfaces.

6. The gauge of claim 1, wherein:
the channel has a larger cross-section dimension than that of the pin bore.

* * * * *